(12) United States Patent
Ramsay et al.

(10) Patent No.: US 6,230,135 B1
(45) Date of Patent: May 8, 2001

(54) TACTILE COMMUNICATION APPARATUS AND METHOD

(76) Inventors: Shannon A. Ramsay; Alexander R. Ramsay, both of 23484 Belaire Ct., Los Gatos, CA (US) 95033

( * ) Notice: Subject to any disclaimer, the term of this patent is extended or adjusted under 35 U.S.C. 154(b) by 0 days.

(21) Appl. No.: 09/241,391

(22) Filed: Feb. 2, 1999

(51) Int. Cl.[7] ............................................. G10L 21/00
(52) U.S. Cl. ................................... 704/271; 704/275
(58) Field of Search .................................. 704/270, 271, 704/275; 434/114

(56) References Cited

U.S. PATENT DOCUMENTS

| | | | |
|---|---|---|---|
| 2,500,630 | 3/1950 | Davis et al. | 704/271 |
| 3,632,887 | 1/1972 | Leipp et al. | 704/260 |
| 3,647,978 | 3/1972 | Hill | 704/251 |
| 3,793,471 | 2/1974 | Mason et al. | 434/114 |
| 3,883,850 | 5/1975 | Martin et al. | 704/251 |
| 4,087,632 | 5/1978 | Hafer | 704/251 |
| 4,215,240 | 7/1980 | Ostrowski | 704/271 |
| 4,215,490 | 8/1980 | Fewell | 434/114 |
| 4,278,838 | 7/1981 | Antonov | 704/260 |
| 4,520,501 | 5/1985 | Dubrucq | 704/271 |
| 4,567,606 | 1/1986 | Vensko et al. | 704/251 |
| 4,687,444 | 8/1987 | Garner | 434/114 |
| 4,694,494 | 9/1987 | Woolfson | 704/260 |
| 4,752,772 | 6/1988 | Litt et al. | 345/160 |
| 4,783,803 | 11/1988 | Baker et al. | 704/252 |
| 4,829,576 | 5/1989 | Porter | 704/235 |
| 4,866,778 | 9/1989 | Baker | 704/254 |
| 4,912,768 | 3/1990 | Benbassat | 704/260 |
| 4,972,486 | 11/1990 | Cornett et al. | 704/271 |
| 4,982,432 | 1/1991 | Clark et al. | 704/271 |
| 4,985,692 | 1/1991 | Breider et al. | 340/472 |
| 4,992,865 | 2/1991 | Park | 348/62 |
| 5,047,952 | 9/1991 | Kramer et al. | 704/271 |
| 5,050,121 | 9/1991 | Vaughan | 707/542 |
| 5,440,663 | 8/1995 | Moese et al. | 704/255 |
| 5,557,269 | 9/1996 | Montane | 341/22 |
| 5,580,251 | 12/1996 | Gilkes et al. | 434/113 |
| 5,583,478 | 12/1996 | Renzi | 340/407.1 |
| 5,615,296 | 3/1997 | Stanford et al. | 704/201 |
| 5,640,485 | 6/1997 | Ranta | 704/251 |
| 5,664,061 | 9/1997 | Andreshak et al. | 704/275 |
| 5,668,926 | 9/1997 | Karaali et al. | 704/232 |
| 5,717,827 | 2/1998 | Narayan | 704/260 |
| 6,083,270 | * 7/2000 | Scott | 703/24 |

\* cited by examiner

*Primary Examiner*—William R. Korzuch
*Assistant Examiner*—Susan Wieland
(74) *Attorney, Agent, or Firm*—Jones, Tullar & Cooper

(57) ABSTRACT

The invention is a tactile communication system which provides a method and apparatus for presenting tactile communications in real time to people who lack the senses of sight, hearing, or both, but who have a functional tactile sense. To facilitate real-time communications, a new Phonetic Braille Code is provided which replaces the existing alphabet-based braille codes. The Phonetic Braille Code uses braille symbols which represent word sounds or phonemes, rather than letters. There is also provided an apparatus which enables the user to change from one-finger braille reading to two-finger or multiple-finger braille reading. The two-finger braille reading method facilitates the simultaneous perception of two-letter phonemes. By reading phonemes using a two finger method, rather than reading letter-by-letter with a single finger, communication speed can be increased to the point of real time. The apparatus of the invention includes several embodiments of portable tactile communication devices. These devices include a computer controller which receives electrical signals, such as from a microphone, and which converts the electrical signals to the Phonetic Braille Code. The controller activates one or more refreshable braille displays to transmit these translated signals to the user. The apparatus preferably uses conventional voice recognition software for receiving verbal communications and for translating the verbal communications into phonemes. The phonemes are then displayed tactilely to the user in the Phonetic Braille Code provided herein.

17 Claims, 3 Drawing Sheets

FIG. 2

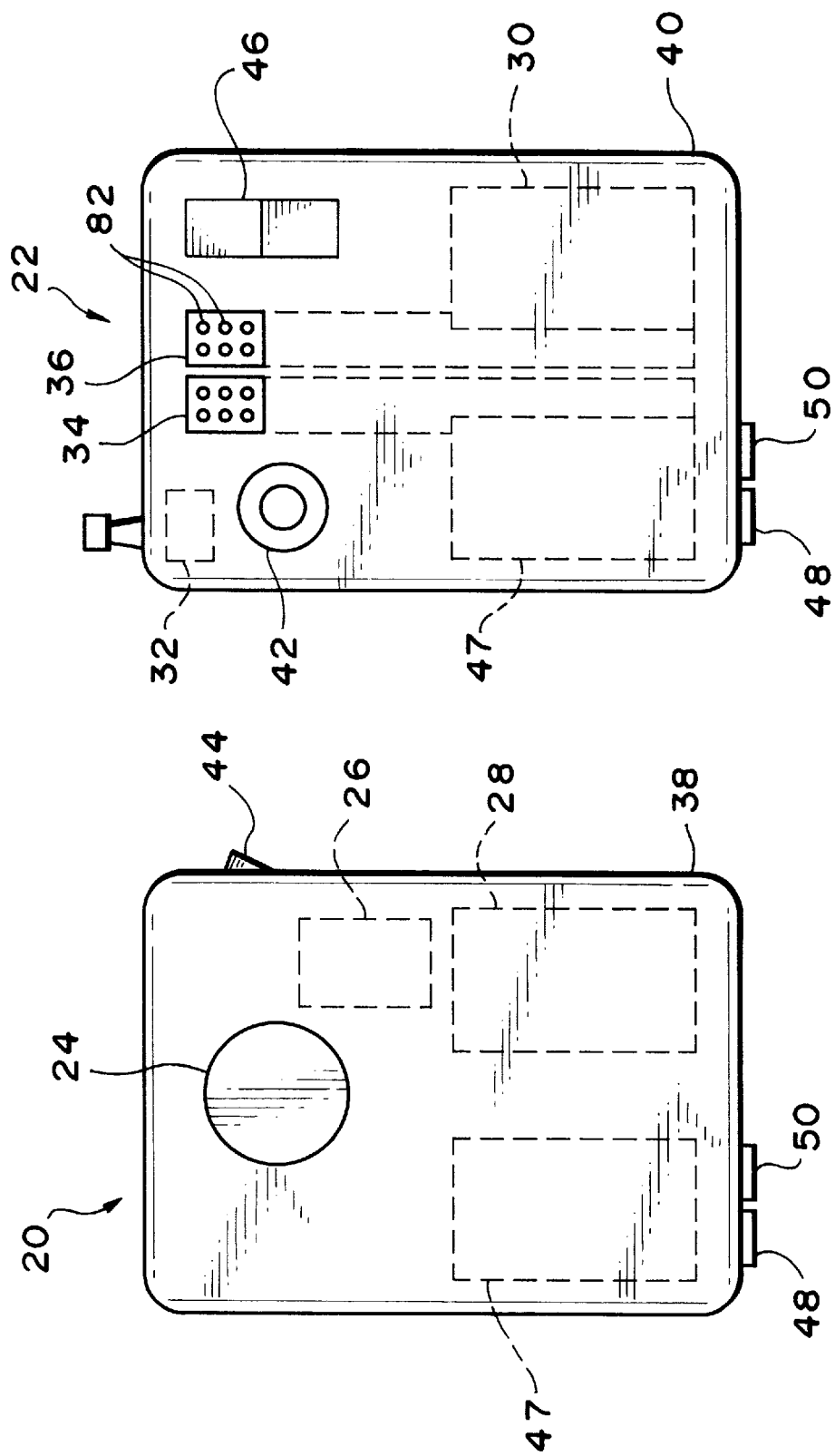

TACTILE COMMUNICATION APPARATUS AND METHOD

BACKGROUND OF THE INVENTION

1. Field of the Invention

This invention is directed to a tactile communication apparatus and method which may be particularly useful to blind, deaf, or deaf-blind users. The invention uses speech recognition software and refreshable braille devices to convey spoken communications directly to the user in a tactile form of communication. The communications may be relayed to the user in real time, or in a time-delayed manner.

2. Description of the Prior Art

Communicating with deaf-blind individuals has always posed considerable challenges. Fingerspelling is one common prior art method for communicating with such individuals. However, fingerspelling requires that the participants in the communication both be conversant in the language. It further requires that the two persons remain in constant touch contact. Thus, people wishing to communicate with a deaf-blind person in this manner must either know the art of fingerspelling or use an interpreter. However, fingerspelling interpreters are expensive and inconvenient to employ on an everyday basis. This may cause particular problems if the deaf-blind person is attending school or participating in other activities which require constant interaction with multiple people unfamiliar with fingerspelling.

Braille is an alternative prior art method of communication for the blind, deaf, and deaf-blind. The braille system is a universally used tactile method of reading and writing. Named for its inventor, Louis Braille, the braille system employs groups of dots embossed on paper or some other flat surface to represent printed letters and numbers. The system's basic "braille cell" 10 is illustrated in FIG. 1, and consists of six dots-like the points of a domino-arranged in vertical columns of three dots each. For convenience, a standard numbering system has been established for the dots whereby the dots in the left column are numbered downward from one to three, and the dots in the right column are numbered downward from four to six, as shown in FIG. 1. From the basic braille cell, 63 dot patterns and a blank can be formed for a total of 64 possible symbol variations. In conventional braille, these patterns, easily identifiable to the touch, represent letters of the alphabet, numbers, punctuation signs, and also certain common letter combinations (such as "ch" and "gh") along with a few common words ("and", "for", "of", "the", and "with").

The common braille code (grade 2) uses combinations of the four upper dots, 1, 2, 4, and 5, to represent the first ten letters of the alphabet (A–J). A "backwards L" formation, consisting of dots 3, 4, 5, and 6, preceding these 10 configurations indicates that they stand for the numbers 1 through 9, and 0. Dots 3 and 6 combined with the upper four dots are used to represent the remaining letters of the alphabet and the other elements in the system. A single dot in the dot-6 position, and set just to the left of a formation, indicates that the formation indicates a capital letter.

Braille first published his dot system in 1829, but wide acceptance was slow in coming. A standard braille system for all English-speaking people was agreed upon in 1932. Grade 1 braille uses a separate cell for each letter; grade 2 braille includes several common letter combinations such as "-ed" or "-ing"; grade 3 braille has several more letter combinations. initially, students learn grade 1 braille, but almost all move on to grade 2 braille, which is used for most books. A standard line of braille consists of a row of 40 braille cells, and a standard page of braille consists of 25 rows of 40 cells.

With the advent of the computer, a number of interactive computer braille devices, such as word processors with braille keypads, have been developed. Speech recognition software has made it possible to transmit oral communications to a computer, and then to a refreshable braille display. However, most of these prior art devices are of the desktop variety and are not portable, or are impractical for other reasons.

Furthermore-and more importantly for effective communication-the prior art devices do not enable the reception of real-time communications. This is because all prior art braille is related directly to the alphabet, and is received by the reader on a letter-by-letter basis. Due to this limitation, it is not possible for the typical user to receive the braille letters and reconstruct them into words quickly enough to keep up with a spoken communication.

Accordingly, a principle object of the invention is to provide a method and apparatus for tactile communication in which the apparatus is portable, and in which real-time communications are possible.

Another object of the invention is to provide a system of communication which allows a user, such as a blind, deaf, or deaf-blind person, to receive verbal communications in a tactile manner in any locale.

Yet another object of the invention is to provide a means for reading braille while holding the fingers stationary over a changing braille display, rather than moving the fingers across a series of braille cells.

Still another object of the invention is to utilize heat or electrical impulses to create or augment the raised dots in the braille display, such as through transforming a film or membrane.

Another object of the invention is to provide a more rapid means of refreshing a braille display so that speed of reading is enhanced.

Yet another object of the invention is to provide a new Phonetic Braille Code which replaces the existing grade 2 braille code. This facilitates real-time communication because the reader receives the braille symbols as representative of sounds instead of as individual letters, and, therefore, can more quickly reconstruct the words being communicated.

SUMMARY OF THE INVENTION

The invention is a tactile communication system which provides a method and apparatus for providing tactile communications in real time to people who lack the senses of sight, hearing, or both, but who have a functional tactile sense. To facilitate real-time communications, a new Phonetic Braille Code is provided which replaces the existing alphabet-based braille codes. The Phonetic Braille Code uses braille symbols which represent word sounds or phonemes, rather than letters. In the new Phonetic Braille Code, a portion of the conventional alphabet-based braille grade 2 code remains unchanged, but it is understood that those letters now represent corresponding sounds. For example, a raised dot at the dot 1 position represents the letter "a" in conventional grade 2 braille. In the new Phonetic Braille Code, this symbol represents the sound of a long "ā", i.e., as in the word "day". Separate braille symbols are used in the Phonetic Braille Code to represent other sounds, such as a short "ă" and other vowel sounds. These additional symbols are converted from certain punctuation and lesser-used symbols in grade 2 braille. Thus, by using braille symbols representative of sounds or phonemes, rather than letters, communications can be interpreted more quickly, and thereby be received in real time. Furthermore, the preferred embodiment of the Phonetic Braille Code also permits conventional alphabet spelling.

In another aspect of the invention, consistent with the object of real-time communication, there is provided an apparatus which enables the user to adapt from one-finger braille reading to two-finger braille reading. While this method is not absolutely necessary for functioning of the invention, it is preferable because it will increase the speed of reception. The two-finger braille reading method also makes easier the reading of phonemes, which are the smallest unit of speech that in any given language distinguish one utterance from another (Webster's New Collegiate Dictionary). Phonemes are usually two letter sounds-for example, "ă" and "b" form the phoneme "ăb". In a two-cell, two-finger read, the short "ă" symbol (dot 4) and a "b" symbol (dots 1, 2) are received simultaneously on the first and second braille pads, respectively, and perceived as the sound "ăb". By reading phonemes using a two finger method, rather than letter-by-letter with a single finger, communication speed can be increased to the point of real time.

The apparatus of the invention includes several embodiments of portable tactile communication devices. These devices include a computer controller which receives communications as electrical signals and converts the electrical signals to the Phonetic Braille Code. The controller activates one or more refreshable braille displays to communicate these translated signals tactilely to the user. The apparatus preferably uses conventional voice recognition software for receiving verbal communications and for translating the verbal communications to phonemes. The phonemes are then displayed tactilely to the user in the Phonetic Braille Code provide herein.

Thus, the present invention provides a tactile communication system which is both portable, and which enables a user to receive communications in real time. The invention will prove invaluable to the thousands of deaf-blind people throughout the world who currently must rely on finger-spelling or other inconvenient means for communication. Accordingly, it will be apparent that the present invention provides a substantial advance in the art of tactile communications.

BRIEF DESCRIPTION OF THE DRAWINGS

FIG. 2 shows a preferred embodiment of the new Phonetic Braille Code of the invention.

FIG. 3a shows a transmitter of a first embodiment of an apparatus of the invention.

FIG. 3b shows a receiver of the first embodiment of the apparatus of the invention.

DESCRIPTION OF THE PREFERRED EMBODIMENTS

Figure 1:
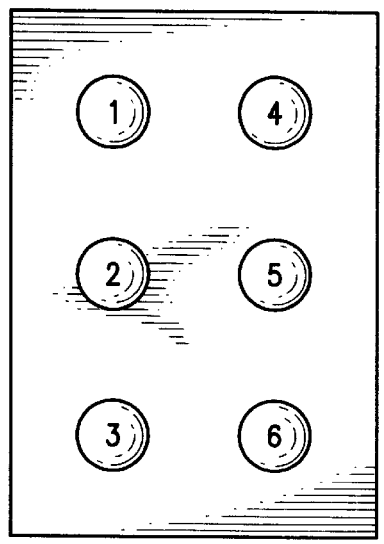
FIG. 1 shows the dot numbering system for a conventional braille cell.

The invention is a communication system directed to an apparatus and method for delivering tactile communications to a person. The person using the system may be deaf-blind, blind, deaf, or otherwise in need of receiving communications in a tactile manner. The communication system is able to receive verbal communications and translate them into tactile communications which may be received by a user in real time.

Figure 2:
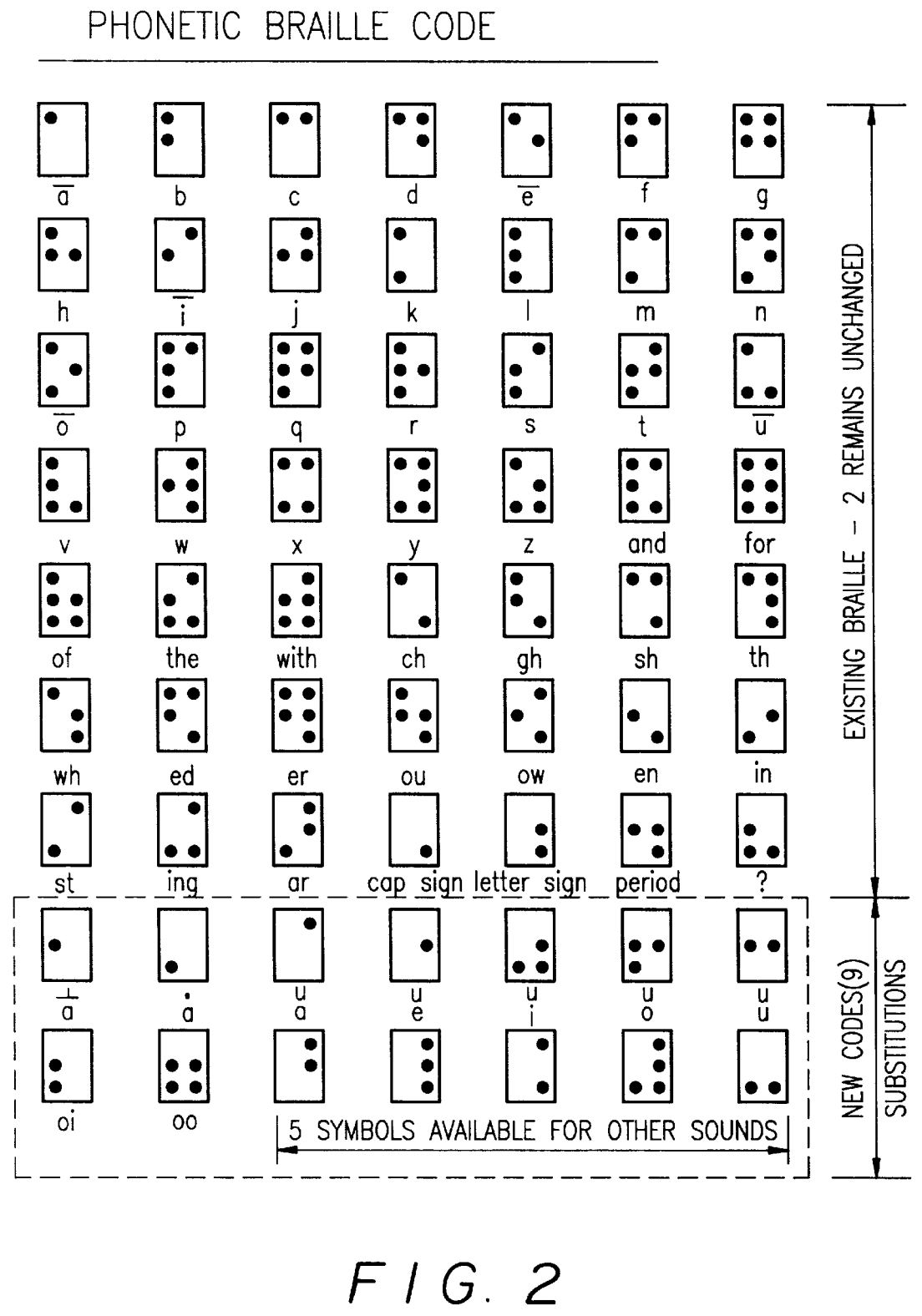

Referring to FIG. 2, there is illustrated a preferred embodiment of the Phonetic Braille Code of the invention. The Phonetic Braille Code makes use of 49 of the existing grade 2 braille symbols, as illustrated in the upper seven rows of FIG. 2. The Phonetic Braille Code also provides for up to 15 possible new symbols when based upon a standard 6-point braille cell. However, for the grade 2 braille symbols which are carried-over, it is to be understood that they represent the phonetic sounds of their respective letters, rather than the letters themselves. For example, the vowels, "a", "e", "i", "o" and "u", all represent the respective long-vowel sounds "ā", "ē", "ī", "ō", and "ū", as shown in FIG. 2. The consonants, "b", "c", "d", "f", "g", "h", "j", "k", "l", "m", "n", "p", "q", "r", "s", "t", "i", "w", "x", "Y", and "z", all represent their respective sounds as well, as do the letter combinations "ch", "gh", "sh", "th", "ed", "er", "ou", "en", "in", "st", "ing", and "ar". The words "and", "for", "of", "the", and "with" remain unchanged, and represent those respective words, as in grade 2 braille. The symbols for "capital sign", "letter sign", "period", and "question mark" also remain unchanged from grade 2 braille.

On the bottom two rows of FIG. 2 there are illustrated 9 new symbols which are believed advantageous for complete functionality of the Phonetic Braille Code. In the realm of spoken communication, all things, including the alphabet, numbers, punctuation, and symbols, such as "#", "%", and "*" have spoken, sound-definable phonemes. Therefore, in designing a new code to fit within a set of 64 variations, it is possible to eliminate the braille grade 2 symbols for all but the phoneme-representative alphabet, and replace these symbols with the additional necessary sound pronunciations.

Webster's Dictionary identifies 65 sound pronunciations in the English language. Some of these are so close in sound that they do not need a separate code symbol. A set of 59 braille symbols has been identified as sufficient to complete what could be described as a "shorthand" braille code. Thus a few of the more rarely used sounds are sacrificed for the sake of speed and simplicity, enabling the user to understand virtually all of any communication.

Since any changes to the widely-used conventional grade 2 braille alphabet code will meet resistance, the preferred form of the new Phonetic Braille Code has been designed with as few changes as possible from the conventional braille grade 2 code. The preferred embodiment of the Phonetic Braille Code set forth in FIG. 2 involves 49 symbols remaining unchanged from grade 2 braille, 9 new symbols replacing punctuation symbols with sounds, and 5 symbols remaining available for future use as additional less-frequently used sounds, or other desirable features. The blank cell may be used as a coding device, and may be referred to as a "space" cell.

Also, a universal leading code symbol can be established to tell a reader whether the transmission is in grade 2 braille or Phonetic Braille Code. The 26 letters of the alphabet remain unchanged in their grade 2 braille symbols. However, depending upon the mode of transmission, each letter can have two meanings. Under the invention, the primary meaning of a specific code symbol is its sound. The secondary meaning of that symbol is its corresponding alphabet letter when preceded by the "letter" symbol (dots 5, 6).

For example, when the long "ā" symbol (dot 1) is normally received, it is perceived as the sound of a long "ā", as in the word "day". However, when the "letter" symbol (dots 5, 6) precedes the long "ā" symbol (dot 1), the transmission is perceived as the printed letter "a". When a "letter" symbol (dots 5, 6) precedes a string of letters, it represents that they are printed letters, and this continues until a "period" symbol (dots 2, 5, 6) indicates an end of the printed letters. A "capital letter" symbol (dot 6) represents a start to a sound code. Thus, the preferred embodiment of the Phonetic Braille Code can be used to deliver communications on a phonetic basis or on a letter-by-letter basis.

Furthermore, the Phonetic Braille Code advantageously can be used to display phonemes to a user. To define a phoneme it is desirable to use two adjacent braille cells, as will be described in more detail below. These braille cells will be referred to as a first braille cell and a second braille cell. Phonemes are the smallest unit of speech that in any given language distinguish one utterance from another. Phonemes are usually formed using two letter sounds, and usually comprise a consonant combined with a vowel. For example, "d" and long "ā" form the phoneme "dā" as in the word "day". In a two-cell, two-finger read, the symbols "d" (dots 1,4,5) and long "ā" (dot 1) would be received simultaneously by the user and perceived as the sound "dā". When a space symbol occurs in either the first or second cell following any phoneme, it represents the end of a word or sentence. Also, while phonetic speech is able to pronounce the words "capital" and "period", these symbols have been maintained for convenience. Accordingly, by reading phonemes using a simultaneous two-finger method, rather than letter-by-letter with a single finger, tactile communication speed can be increased to the point of real time.

Additionally, the new Phonetic Braille Code has been designed for easy learning. All existing grade 2 braille codes for the alphabet are used for corresponding letter sounds. In addition to the dot 1 code for long "ā", three additional pronunciations for the letter "a" are assigned a different single-dot code (dot 2, dot 3, and dot 4, as illustrated in FIG. 2). The other non-long vowel sounds also have new symbols identified. Learning the new code is made easy by the fact that the symbol set is the same whether used in the first or second braille cell. Also, the new code can be learned using just one braille cell. The second braille cell could then be added as the second finger begins to become more adept at reading braille displays. Gradually, the user's brain will assimilate the two finger inputs into single identifiable phonemes. This will enable reception of communications at real-time speeds, i.e., as quickly as a typical person speaks.

Several embodiments of apparatuses for carrying out the method of the invention are provided. A first embodiment of such an apparatus is illustrated in FIGS. 3a and 3b. FIG. 3a shows a portable transmitter 20 and FIG. 3b shows a portable receiver and tactile communicator 22. Transmitter 20 receives verbal communications and transmits them to receiver 22. Receiver 22 then presents a corresponding braille display so that the user can receive the communications in a tactile form.

Transmitter 20 includes a microphone 24 for receiving spoken communications and converting the spoken communications into electric signals. Transmitter 20 also includes a transmission unit 26 which delivers electromagnetic signals to receiver 22. At least one computer controller, such as a microprocessor, is included in transmitter 20 and/or receiver 22. In the embodiment shown, transmitter 20 includes a first controller 28 and receiver 22 includes a second controller 30. First controller 28 is equipped with voice recognition software which receives signals representing the verbal communications from microphone 24. First controller 28 uses the voice recognition software to distinguish the communications into the phonemes being used by the speaker in the spoken communication. Suitable voice recognition software for this purpose is in current commercial use, and is available from several sources, including Dragon Systems, Inc., of Newton, Mass.

Transmission unit 28 then is used to transmit electromagnetic signals representing the phoneme signals to receiver 22. Receiver 22 has a receiving unit 32 which receives the signals and delivers them to second controller 30. Second controller 30 receives the signals representative of phonemes and translates them into the Phonetic Braille Code set forth above in FIG. 2. Second controller 30 then displays these signals to the user in the Phonetic Braille Code by activating first and second refreshable braille display pads 34,36, respectively. Thus, the verbal phonemes spoken by the speaker may be almost instantaneously displayed to the user as tactile symbols representing phonemes.

Transmitter 20 and receiver 22 are contained within pocket-size cases 38, 40, respectively, of about 1×4×6 inches in dimension, and constructed of plastic or other suitable material. Transmitter 20 and receiver 22 may communicate with each other through any known means, such as radio waves, shortwave, cellular telephone, or other wireless transmission means. Alternatively, transmitter 20 may be hard-wired to receiver 22, although this may slightly reduce the convenience of the system. Also, it will be apparent that the components of transmitter 20 and receiver 22 may be integrated into a single unit, as will be discussed below with respect to the second embodiment of the apparatus. In this manner, a single unit would include a microphone, a single computer controller, and one or more braille display pads. The single controller would perform all functions, including interpreting voice communications into phonemes, and sending appropriate braille display signals to the braille display pads. Such an integrated unit is practical if the microphone is sufficiently sensitive to pick up a desired speaker's voice, while filtering out undesirable background noise.

Either first controller 28, second controller 30, or both controllers may include random access memories, a memory buffer, or the like, so that a time delay may be optionally included between reception of a communication and its display on braille pads 34, 36. A more permanent type memory, such as a hard drive, a floppy disk drive, or a solid state memory may also be incorporated into one of the units 20, 22 for enabling playback of a communication at a later time. A speed control knob 42 may be included with the receiver for controlling the refresh rate of first and second braille pads 34, 36. The position of the speed control knob would indicated to second controller 30 the desired rate at which signals are to be delivered to first and second braille pads 32, 34. This enables the user to control the rate of reception of the communication in accordance with his or her ability, and, thus, ensures that information is not lost.

On-off switches 44, 46 may be included with transmitter 20 and receiver 22 for controlling the delivery of power to the components. Alternatively, transmitter 20 may be voice-activated, and may fiction as long as microphone 24 is receiving a voice input. Similarly, receiver 22 may be signal activated, and may function as long as a signal is being transmitted by transmitter 20. Furthermore, receiver 22 may include a vibrating function similar to a conventional pager to notify the user that a signal is about to be received.

Transmitter 20 and receiver 22 are preferably battery powered, and use conventional rechargeable batteries 47.

These batteries 47 are recharged using charging ports 48 located on transmitter 20 and receiver 22. Also connection ports 50 may be included for connecting transmitter 20 or receiver 22 to a personal computer or the like. This enables downloading of communications from the memory buffer or other memory device for permanent storage or later use. Connection port 50 may also be used for loading, modification, or updating of software, or the like.

Furthermore, connection of receiver 22 to a personal computer could be used to receive written communications in a tactile form as well. For example, a written document in a word processing format could be read by a user using the system of the invention. The written communications could be translated into the Phonetic Braille Code of the invention using appropriate software, or could merely be received in grade 2 braille code on the apparatus of the invention, with appropriate software, and depending upon the user's preference. A personal computer connection could also be used by the user to practice receiving phonemes and the Phonetic Braille Code to establish proficiency in using the two-finger reading method of the invention. Of course other controls and features may be incorporated into transmitter 20 and receiver 22 as necessity and convenience may dictate.

Figure 5:
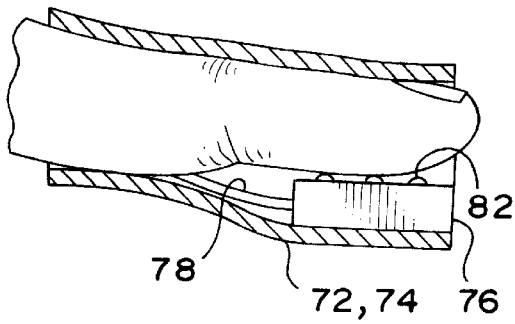
FIG. 5 shows an cross section of the finger mounting apparatus of FIG. 4.
Figure 4:
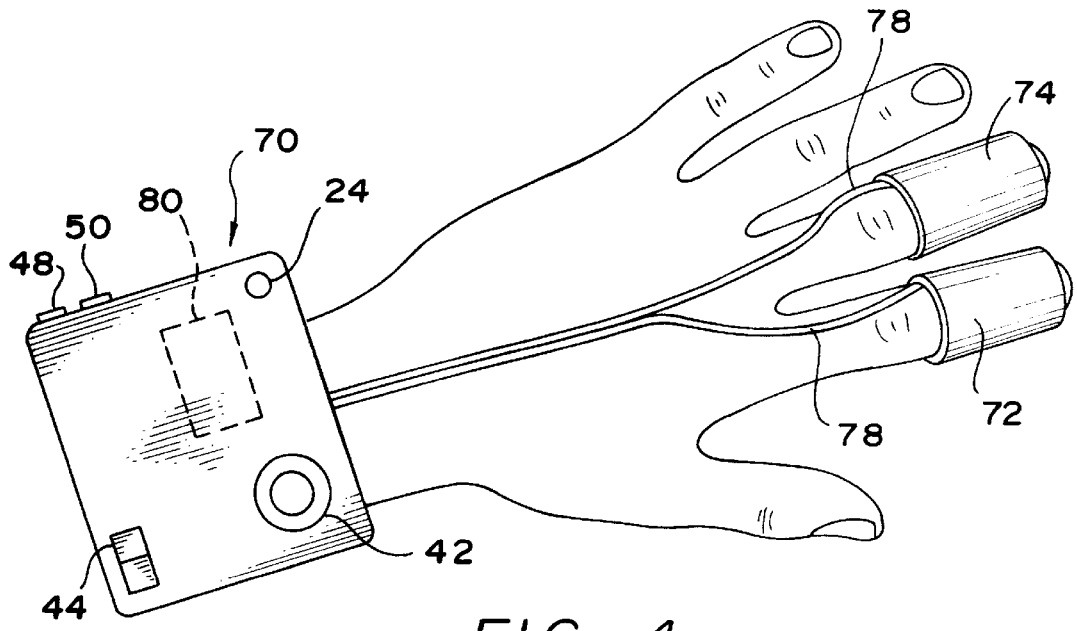
FIG. 4 shows a finger-and-wrist-mounted second embodiment of the apparatus of the invention.

FIGS. 4 and 5 illustrate a second embodiment of the apparatus of the invention. A finger-and wrist mounted integrated unit 70 is illustrated in FIG. 4. The finger-mounted portion of unit 70 includes first and second finger sleeves 72, 74, with each finger sleeve 72, 74 containing a refreshable braille display pad 76, as illustrated in FIG. 5. Finger sleeves 72, 74 are constructed of an elastic, glove-type material which is formed into tubular sleeves of an appropriate size for fitting over the user's fingers. Finger sleeves 72, 74 hold braille display pads 76 in contact with the user's fingers so that the user is able to tactilely sense braille symbols displayed on pads 76. In this manner, the user is in constant contact with display pads 76, and can receive communications at any time.

Also, finger sleeves 72, 74 may be mounted on any of the user's fingers, depending upon personal preference and tactile sensitivity. In another aspect, a greater number of finger sleeves may be mounted on a user's fingers to facilitate quicker assimilation of information. For example, three or four finger sleeves may be used. In this manner, the user may receive three-letter phonemes, or may receive a pair of two-letter phonemes simultaneously.

Display pads 76 are connected to wrist-mounted unit 70 by wires 78 which deliver signals from unit 70 to display pads 76. Wrist-mounted unit 70 is an integrated unit containing the components discussed above with respect to the first embodiment of FIGS. 3a and 3b. Corresponding components have been given the same reference numbers as above. Accordingly, wrist unit 70 includes a microphone 24 for receiving verbal communications and delivering them to a computer controller 80 located within unit 70. Also, since microphone 24 is mounted on the user's wrist, the user is able to hold the unit and microphone out toward the speaker if necessary to better facilitate receiving the verbal communications. Wrist unit 70 also includes an on-off switch 44, and a speed control knob 42, which function as discussed above. A charging port 48 and computer connection port 50 are also included. Of course, wrist unit 70 may further include the optional features discussed above, such as voice activation, permanent memory storage, vibration notification of incoming signal, and the like.

Since wrist unit 70 is an integrated unit, it has a single computer controller 80 which receives electrical signals representative of verbal signals from microphone 24. These signals are processed using voice recognition software, and translated into phonemes, as discussed above. The phonemes are then translated into the Phonetic Braille Code and delivered to refreshable braille display pads 76 through wires 78. Alternatively, of course, wrist unit 70 may be just a receiver 22, as set forth above in FIG. 3b, but with finger sleeve-mounted display pads 76 in place of first and second braille pads 34, 36. Also, it will be apparent unit 70 need not be wrist mounted, but instead may be located in a user's pocket, or other location. This may be more convenient in the case where unit 70 is just a receiver, rather than an integrated unit as shown.

The refreshable braille display pads 34, 36, 76 used in the present invention may be of any conventional type. These pads generally include six extendable and retractable pins 82 which are located in the six dot positions shown in braille cell 10 of FIG. 1. Pads 34, 36, 76 may incorporate piezoelectric polymers, shape memory alloys, micro-solenoids, or other motive means known in the art for extending and retracting pins 82. Suitable display pads are disclosed in U.S. Pat. No. 5,583,478 to Ronald Renzi, the disclosure of which is incorporated herein by reference.

It is also possible to use other types of refreshable braille displays with the apparatus of the invention. Such displays may take the form of a sheet or membrane in which raised dots may be temporarily created by applying heat or electrical energy. One such display is disclosed in U.S. Pat. No. 5,580,251 to Gilkes et al., the disclosure of which is incorporated herein by reference.

From the foregoing, it will be apparent that the present invention sets forth a novel tactile communication system which will be of great utility to the deaf-blind and other people dependent upon tactile communication. The method and apparatus of the invention provide a portable communication system which enables the user to receive verbal communications in real time by perceiving the communications tactilely. The Phonetic Braille Code set forth herein will greatly increase the speed at which tactile communications can be received. Furthermore, since there are a limited number of sounds used in all human languages, the Phonetic Braille Code could be the basis of an International Braille Code which will facilitate communication between individuals that are dependent on this form of communication. In addition, the apparatus of the invention encourages a two-finger or multiple-finger manner of reading braille symbols on a portable device. This arrangement is particularly useful for reception of symbols representing phonemes, but can also be used for receiving conventional grade 2 braille code. Thus, while preferred embodiments have been described herein, it will be recognized that a variety of changes and modifications may be made without departing from the spirit of the subject invention, the scope of which is set forth in the following claims.

What is claimed is:

1. A method for conveying verbal communications as tactile communications, said method comprising:
receiving a verbal communication;
translating the verbal communication into a phonetic braille code which is representative of the phonetic sounds of the original communication; and transmitting said code to a refreshable tactile display device having at least two sixpoint refreshable braille displays, whereby the user is able to receive generally simultaneously on said at least two braille displays a tactile communication which is representative of the phonetic sounds of a phoneme of the original verbal communication.

2. The method of claim 1 further including the step of translating the verbal communication into phonemes using voice recognition software prior to translating the communication into a phonetic braille code.

3. The method of claim 1 further including the step of providing a tactile braille code in which braille symbols are representative of phonetic sounds and in which said code is displayable on a refreshable six-point braille display device.

4. An apparatus for providing tactile communication to a user said apparatus comprising:

a pair of refreshable six-point braille display pads;

a controller for receiving a first set of electric signals representing an original nontactile communication and for translating the original communication into a second set of electric signals representative of phonetic sounds corresponding to the original communication; and a display pad control means for activating the display pads generally simultaneously so as to display to a user a pair of symbols representative of a two-letter-sound phoneme.

5. The apparatus of claim 4 further including a microphone for receiving verbal communications and for delivering the communications to the controller as said first set of electric signals.

6. The apparatus of claim 5 further including a transmitter housing and a receiver housing;

said transmitter housing containing said microphone, said controller, and a transmitting unit; and said receiver housing containing said pair of display pads, said display pad control means, and a receiving unit for receiving signals from said controller via said transmitting unit.

7. The apparatus of claim 6 wherein said receiver housing can be mounted on the arm of a user.

8. The apparatus of claim 7 wherein said pair of braille display pads are contained within elastic sleeves and are mountable on the user's fingers.

9. The apparatus of claim 4 further including a memory means associated with said controller for retaining a portion of said communication prior to delivery to said display pads.

10. The apparatus of claim 9 further including a display pad speed controller for controlling the rate at which communications are delivered to said display pads.

11. A portable apparatus for translating verbal communications from a speaker into tactile communications perceptible to a user through touch, said apparatus comprising:

at least two refreshable six-point braille display pads for contacting the fingers of the user;

a microphone for receiving the verbal communications from the speaker; and a computer controller programed for translating the verbal communications into braille symbols representative of a phonetic code which corresponds to the phonetic arrangement of the verbal communication, said controller further being programed to activate the refreshable display pads in accordance with the translated braille code symbols so as to transmit at least two said symbols generally simultaneously to the user for representing to the user a phoneme comprised of at least to two phonetic sounds.

12. The apparatus of claim 11 further including a transmitter housing and a receiver housing;

said transmitter housing containing said microphone, said controller, and a transmitting unit; and said receiver housing including said display pads, a display pad activation means, and a receiving unit for receiving signals from said controller via said transmitting unit.

13. The apparatus of claim 11 wherein said at least two braille display pads are contained within elastic sleeves and are mountable on the user's fingers.

14. The apparatus of claim 11 further including a wrist-mounting means for mounting at least a portion of said apparatus on the arm of the user.

15. The apparatus of claim 11 further including a connection port for connecting said controller to a personal computer.

16. The apparatus of claim 11 further including a memory buffer associated with said controller for retaining some of the communication prior to delivery to the display pads.

17. The apparatus of claim 16 further including a speed control means for controlling the rate at which communications are delivered to the display pads.

* * * * *